US005579524A
United States Patent [19]
Kikinis

[11] Patent Number: 5,579,524
[45] Date of Patent: Nov. 26, 1996

[54] OPTIMIZED POWER SUPPLY SYSTEM FOR COMPUTER EQUIPMENT

[75] Inventor: Dan Kikinis, Saratoga, Calif.

[73] Assignee: Elonex I.P. Holdings, Ltd., London, England

[21] Appl. No.: 432,527

[22] Filed: May 1, 1995

Related U.S. Application Data

[63] Continuation of Ser. No. 131,767, Oct. 4, 1993, abandoned.

[51] Int. Cl.$^6$ .............................. H02J 9/06; G06F 11/00
[52] U.S. Cl. .................. 395/750; 365/226; 365/227; 365/229; 364/707; 364/431.11; 307/65
[58] Field of Search ........................... 395/750; 365/226, 365/227, 229; 364/707, 431.11; 307/65

[56] References Cited

U.S. PATENT DOCUMENTS

| | | | |
|---|---|---|---|
| 4,232,377 | 11/1980 | Tallman | 365/229 |
| 4,288,865 | 9/1981 | Graham | 365/229 |
| 4,654,821 | 3/1987 | Lapp | 364/900 |
| 4,766,567 | 8/1988 | Kato | 395/750 |
| 4,816,862 | 3/1989 | Taniguchi et al. | 365/229 |
| 4,868,832 | 9/1989 | Marrington et al. | 365/229 |
| 5,036,532 | 7/1991 | Metroka et al. | 455/127 |
| 5,095,438 | 3/1992 | Sasaki | 364/431.4 |
| 5,148,042 | 9/1992 | Nakazoe | 307/65 |
| 5,218,607 | 6/1993 | Saito et al. | 371/66 |
| 5,220,671 | 6/1993 | Yamagishi | 395/750 |
| 5,270,946 | 12/1993 | Shibasaki et al. | 395/750 |
| 5,293,494 | 3/1994 | Saito et al. | 395/275 |
| 5,297,282 | 3/1994 | Meilak et al. | 395/700 |
| 5,430,867 | 7/1995 | Gunji | 395/750 |
| 5,467,469 | 11/1995 | Saito et al. | 395/750 |
| 5,471,621 | 11/1995 | Ohtsuki | 395/750 |
| 5,497,455 | 3/1996 | Suga et al. | 395/159 |

*Primary Examiner*—George B. Davis
*Attorney, Agent, or Firm*—Donald R. Boys

[57] ABSTRACT

A power supply system for a general purpose computer has plural power supplies for powering selected groups of components. One of the power supplies serves the keyboard and its controller, and the keyboard controller is configured to turn the other power supply or supplies on and off in response to user input at the keyboard. The use of separate power supplies increases the efficiency of the computer when operating in reduced power modes.

16 Claims, 4 Drawing Sheets

OPTIMIZED POWER SUPPLY SYSTEM FOR COMPUTER EQUIPMENT

This is a continuation of application Ser. No. 08/131,767 filed Oct. 4, 1993, now abandoned.

FIELD OF THE INVENTION

This invention is in the area of general-purpose computers, and pertains more specifically to power supplies for general-purpose computers.

BACKGROUND OF THE INVENTION

State-of-the-art power supplies in general-purpose computers typically use pulse-width modulation to digitally regulate power generation. A typical power supply first converts the incoming 60-Hz utility power frequency to a much higher frequency range, such as 20,000 cycles per second. The duration of each power pulse is varied in response to the needs of the computer circuitry being supplied. The width of the pulses is controlled by electronically switching the current flow on and off. The pulses are reduced in voltage by a step-down transformer and turned into direct current by rectification and filtering. Switching the current off and on reduces losses in power from heat dissipation and makes power supplies relatively efficient.

Power supplies used by general-purpose computers produce different distinct voltages that are used by powered devices and circuits within each machine. Nearly all circuitry in state-of-the-art computers, from microprocessors to memory, requires either 5 or 3.3 volts. The motors of most disk drives use either 12 or 5 volts. Serial ports and some other input/output (I/O) devices often require both a positive and negative 12 volt supply. A few components and peripherals also require a negative 5 volt direct current supply.

Typically, a single power supply supplies all required voltages and varying amperage requirements to the different components that comprise a general-purpose computer system. The power supply's maximum power output must be rated close to the sum of all the power needs of installed components and expected addition of peripherals. It is a common practice, therefore, to provide a power supply rated considerably higher than the average usage of a system.

To work at optimum efficiency, the ratio of minimum to maximum load, or minimum to maximum power requirement, should not exceed a ratio of approximately 1:6. When a much larger power supply than is needed is initially installed, power efficiency is decreased for low power modes of operation. Efficiency may also be affected negatively when personal general-purpose computers incorporate advanced power (APM) management systems that have low-power modes, such as a standby mode.

Typically, these power-saving computers have four operating modes, with greatly varying power consumption. As an example, power modes in a typical portable general purpose computer may be as follows: a peak mode at approximately 90 watts for power-on surge; a normal mode at about 50 watts for operation with full expansion capabilities; a suspend mode at about 10–15 watts for no processing activity, but data is retained in random access memory (RAM); and a standby mode at about 1–2 watts for power only to wake-up circuits. Control for these power management modes is typically incorporated into the basic input/output system (BIOS) and works independently of state-of-the-art installed power supplies.

In this example, a power-saving system consumes as little as 1–2 watts in standby mode and as much as 90 watts in the power-on peak mode as described above. This design reduces power efficiency in trade for a power management system with low-power standby modes. In an additional effort to save power, manufacturers of general-purpose computers are reducing voltage levels to 3.3 volts for system microprocessors, integrated circuits and memory. This decreases power efficiency further when only system board functions are activated.

Designing and producing power-saving computers can significantly reduce the use of valuable natural resources. The Environmental Protection Agency (EPA) estimates that the annual energy consumption of office equipment has risen 400 percent between 1983 and 1993, and computers represent a large portion of this growth. That is a compound annual growth rate of about 17 percent, exceeding most estimates of workplace productivity improvements for the same period. Considering very low efficiencies associated with electric air-conditioning required to cool computerized equipment, every watt that goes into a general-use computer may actually represents as much as 3.3 watts of total demand. It is estimated by the EPA that the power to operate a personal computer and cool the space around it may cost as much as a personal computer costs on an annualized depreciation basis. These considerations have prompted the EPA to establish an Energy Star Computer Program to affix a government Energy Star seal on desk-top and workstation computers that can maintain a suspend mode of less than 30 watts. The federal government has even expressed that in the future they will but only such machines.

What is needed now is a power supply system for general-purpose computers that can be efficient at low power modes but can still have sufficient peak power for expanded configurations, with even larger power demands at varying time intervals. The present invention optimizes the use of an APM system with a power supply that can deliver optimized efficiency over different load requirements.

SUMMARY OF THE INVENTION

In an embodiment of the invention, a plural-mode power supply system for powering elements of general-purpose computers is provided. The computer has system circuitry comprising computing elements and non volatile memory, a keyboard having a keyboard controller, and electrically powered elements peripheral to the system circuitry and the keyboard, including but not limited to, one or more hard disk drives, one or more floppy disk drives, and system video display elements. The plural-mode power supply system comprises a first power supply for powering the electrically powered peripheral elements; a second power supply for powering the system circuitry, the keyboard, and the keyboard controller; a first electrically operable, normally open switching means with the operating element connected to the output of, and operable by, the output of the first power supply, and the output from the second power supply for the system circuitry connected through the normally open contacts of the electrically operable switch; and a second electrically operable switching means configured to turn the primary power on and off to the first power supply in response to the presence or absence respectively of an input signal at the voltage level of the second power supply.

In another embodiment there is a third power supply powering another group of peripheral devices, and other embodiments may employ even more power supplies. The use of separate power supplies for separate groups of circuitry provides enhanced efficiency by allowing the computer to operate in reduced power modes with a power supply more closely matched to the powered circuitry than would be the case if all the computer were powered by a single power supply.

In further embodiments, pushbutton switches or toggle switches may be employed to initiate reduced power operating modes for the computer, and also to cause the computer to resume full power operation.

DESCRIPTION OF THE PREFERRED EMBODIMENTS

Figure 1:
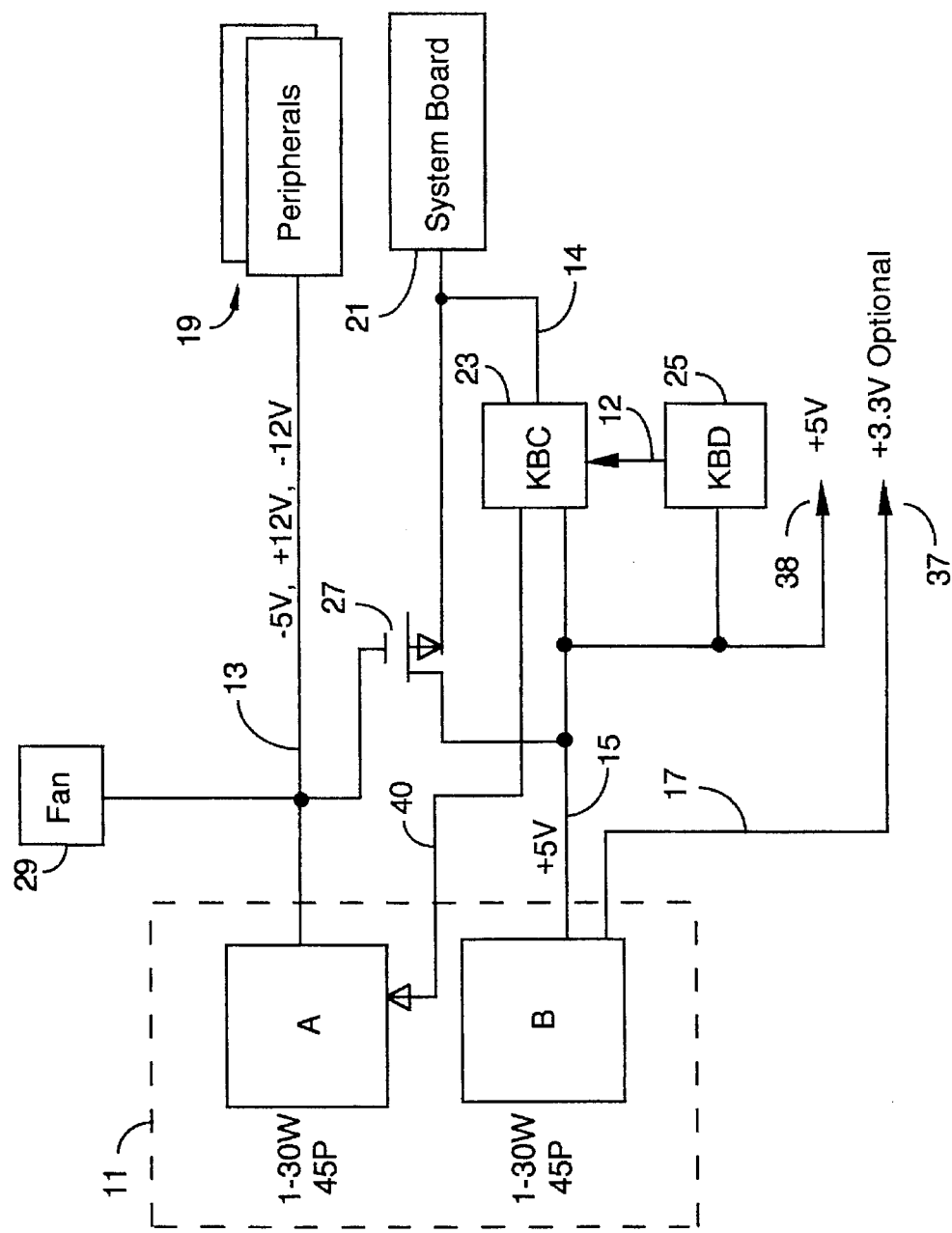
FIG. 1 is a block diagram of a general-purpose computer with a power supply unit according to an embodiment of the present invention.

The present invention addresses the inefficiencies that state-of-the-art power supplies in general-purpose computers exhibit while operating in reduced-power-consumption modes. FIG. 1 is a block diagram of a general-purpose computer in an embodiment of the invention. Power supply unit 11 comprises two power supplies A and B. In this embodiment supply A is a Command Supply and supply B is a Main Supply. Command Supply A supplies regulated voltages of −5, +12 and −12 volts on line 13 to system peripherals 19 at a nominal load of 30 watts and a peak load of 45 watts.

System peripherals comprise any electronic device compatible with one of these voltages for operation. Typically, in a portable, general-purpose computer such devices would be the hard drive, modem, local area network card, cooling fan and/or other serial port I/O devices. The video display and its driving circuitry also fall into this class for purposes of the present invention.

Main supply B supplies a regulated voltage of +5 volts on line 15 at a nominal load of 30 watts and a peak load of 45 watts. Supply B powers the computer's system board to operate all related bus, memory and microprocessor power requirements. Main Supply B also allows for optional power connections at a connection point 38 to run low voltage peripherals, and optionally +3.3 volts at connection point 37 to provide power to CMOS and other low voltage integrated circuits. In an alternative embodiment the system board could be a board powered at 3.3 V, and the output of supply B shown as 5 V could be 3.3 V.

In this arrangement, the system's power requirements are balanced between the two supplies A and B. The fixed and equal split of 90 watts between the two power supplies A and B is exemplary. Power supplies of different nominal and peak capacities may be used where load requirements dictate. The split configuration allows each power supply to operate at improved efficiency by inherently maintaining a higher ratio of minimum to maximum load requirements. The two power units A and B in this embodiments are turned on synchronously by a solid-state switch, such as a Metal Oxide Semiconductor Field Effect Transistor (MOSFET) switch, not shown.

In this embodiment, a user can select to go into a standby mode by inputting to keyboard 25 a keystroke or keystroke combination that sends a signal to keyboard controller on path 12. Keyboard controller 23 in turn sends a shutdown signal on line 40 to Command supply A, turning it off. This removes power from fan 29 and peripherals 19, and by opening switch 27 removes power to system board 21. Main supply B remains on, and powers keyboard controller 23 and keyboard 25. Standby mode represents the lowest power consumption mode for the computer. To the user, standby mode is synonymous with turning the computer off. That is, the user should save work in progress, close applications, exit to the system prompt, and then press a predetermined key or key combination.

In the standby mode, only the keyboard and controller keyboard are active in this embodiment and powered by a single power supply B. From standby, when a user again uses the keyboard, the first keystroke causes a signal on line 40 from keyboard controller 23 to turn power supply A on again, returning power to peripherals 19 and switch 27. Switch 27 closes, and power is restored to system board 21. There are a number of equivalent ways that a signal on line 40 may turn power supply A on and off. For example, output on line 40 may operate a solid-state switch (not shown) which controls primary power to power supply A.

In the embodiment shown in FIG. 1 a user may initiate a suspend mode by a different combination of keystrokes to keyboard 25. In this case a +5 V output from keyboard controller 23 on line 14 powers system board 21, maintaining volatile memory on the board, while power supply A is shut down by a signal in line 40.

Figure 2:
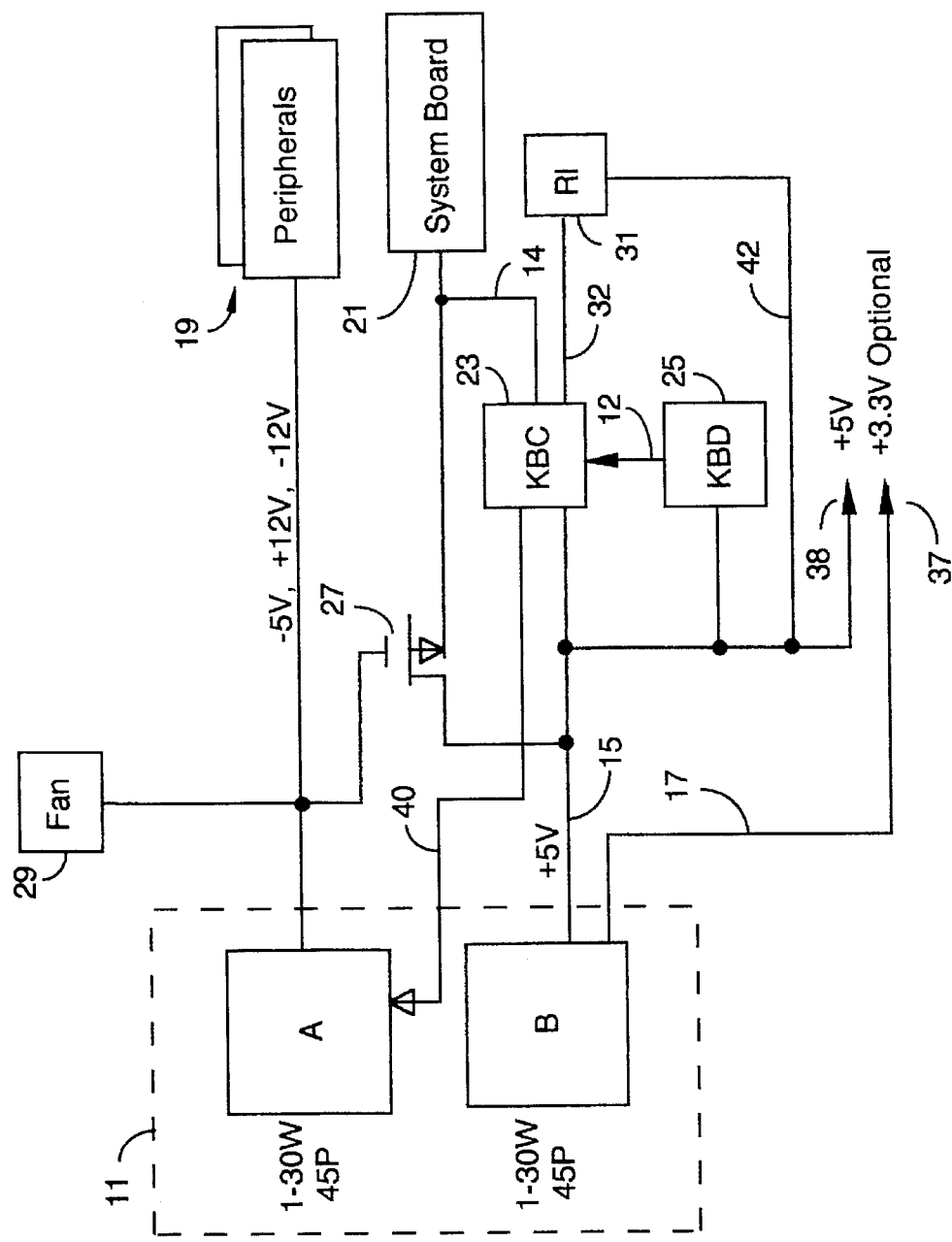
FIG. 2 is a block diagram of a general-purpose computer in an embodiment of the present invention comprising a Fax/modem ring indicator circuit.

FIG. 2 shows an alternative embodiment that incorporates a ring indicator 31, which may be powered by supply B on line 42. The ring indicator signal from any conventional fax/modem or other transmission device is directed to keyboard controller 23 on line 32. While in standby or suspend mode the keyboard controller is active and receives a signal from the ring indicator. Keyboard controller 23 then signals power supply A for power-up as described above, to receive any electronic data from an outside transmission line. This configuration permits a system to be always ready to receive incoming communications via a fax/modem, but to consume significant quantities of power only when the fax/modem is actually in use. A termination signal may also may be received by the keyboard controller from the transmission device to initiate power-down to either standby or suspend mode shortly after receiving the communication.

In yet another alternative embodiment push button inputs or switches may be used to activate standby and/or suspend mode. For example, a push button labeled Standby may be provided to turn power off to power supply A and another labeled Suspend to turn power supply A off while maintaining power to system board 21. Another push button labeled Resume could return power to power supply A. There are many equivalent ways that such inputs might be arranged, which will be apparent to one with skill in the art.

In another aspect of the invention separate power supplies may replace single power supplies in desk-top and workstation computers. Any number of separate power supplies at different peak ratings may be incorporated into a design to best reflect individual system power consumption and production costs. For example, in yet another embodiment according to the invention a power module concept may be practiced where a computer grows with the addition of peripherals by also adding power supply modules.

Figure 3:
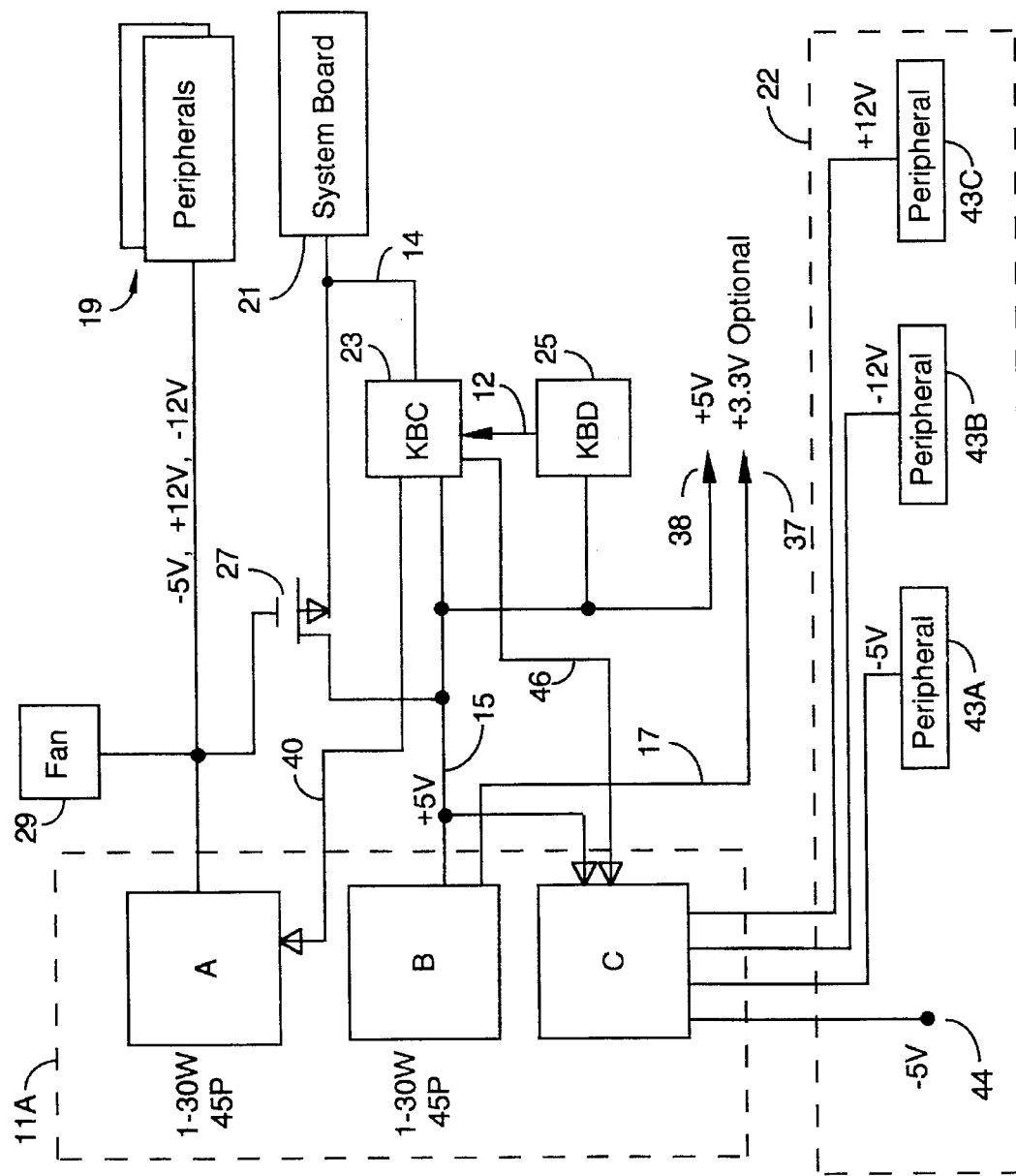
FIG. 3 is a block diagram of a general-purpose computer according to another embodiment of the present invention and comprising multiple power supplies.

FIG. 3 is a block diagram comprising a modular unit 11A and comprising an additional power supply C connected directly to keyboard controller 23 and to a number of dedicated peripherals 43A, 43B, and 43C. It also has an additional unused power connection 44. In this embodiment, each power connection may have a different voltage output to match the requirements of the installed peripherals.

The additional peripherals, in this example, may be devices dedicated to expansion slots 22 in a general-purpose computer and represent peripherals above and beyond the standard installed power consumption devices, such as floppy disk drives, hard disk drives and internal modems. In this embodiment, Command power supply A supplies the standard power devices and is connected to switch 27, which disconnects the system board from Main supply B to initiate a standby mode. In the event of a standby or suspend signal, the modular power supply C is signaled on line 46 to shut down power. In this aspect there may be standardized bays, either externally or internally, where additional power supplies such as power supply C are inserted as required. Through other dedicated keystrokes modular power supply C may also be powered up by a signal on a separate line 46. This enables a user to select which modular power supply to power up or down when more than one modular power supply is configured in the system. Custom-configured supplies employing sub-module construction offer flexibility in final design configuration and a means of controlling both initial equipment costs and power losses. Any number of modular power supplies may be dedicated to any number of peripheral banks through system BIOS utilizing machine control routines or a system board read only memory (ROM). In this arrangement each modular power supply may be powered up or down via line 40 and/or dedicated line 46, and system power losses due to the efficiency ratio are kept to a minimum. Less power loss means cooler operating temperatures that may lead to the elimination of some or all power supply cooling fans, thus further saving power and saving on ambient air-conditioning expenses as well.

Figure 4:
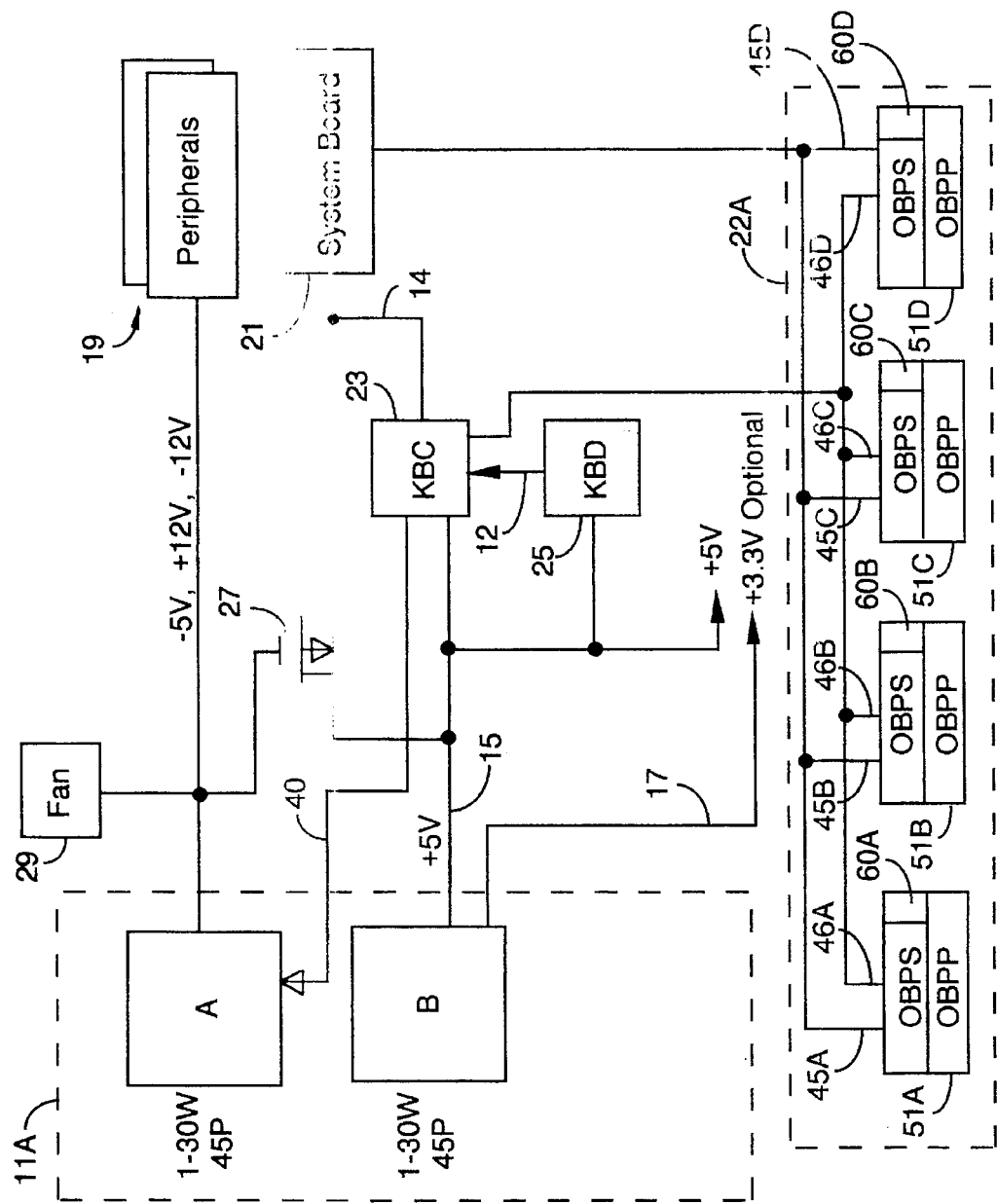
FIG. 4 is a block diagram of a general-purpose computer in an embodiment of the present invention comprising multiple power supplies incorporated on individually driven peripherals.

In yet another aspect of the invention, separate power supplies may be solid-state, single-chip power supply ICs. In FIG. 4, IC power supplies are shown dedicated, sized and mounted on individual peripheral printed circuit boards for optimal power efficiency. Each peripheral carries its own power supply and system board 21 powers up each on-board-power-supply. In this example, on-board-power-peripheral devices 51A, 51B, 51C and 51D are connected by lines 46A 46B, 46C and 46D to keyboard controller 23. In this aspect of the invention, separate microprocessors 60A, 60B, 60C, 60D are dedicated to individual on board power supplies to switch their individual power on and off states directly by control from keyboard 25 though keyboard controller 23. In another configuration, each device's power status and individual proprietary advanced power management may be manipulated through user-friendly machine control routines interfaced to the BIOS. Each on board power peripheral may have different operational voltages. Their respective power requirements are supported through standard expansion bus slots 22A in system board 21, as illustrated in the line connections 45A, 45B, 45C and 45D.

In this arrangement, the on board power peripherals are powered down in the event that the system board's Main supply B is disconnected by switch 27. Further enhanced power modes may be controlled as described above. Each on board power peripheral in FIG. 4 is illustrated in block form as containing a power-supply and peripheral circuitry. In this embodiment, a general-purpose computer maintains near-constant load demands in relation to maximum power levels, therefore delivering optimum efficiency.

An additional embodiment may incorporate the use of multiple power supplies in an external power supply, where the external power supply may be upgraded with power modules as necessary to drive more complex and device-intensive computers. This would be an advantage by first, reducing audio interferences associated with internally installed power supply cooling fans, and secondly by providing a significant reduction in the computer's size. It is possible to implement the invention into existing computer packaging constraints, as well as other electronic devices, and use the electrical connections from existing system boards. There are a number of equivalent ways that several alternatives may be implemented in order to provide improved power efficiencies to present and future generations of general-purpose computers. The embodiments of split and multiple power supplies will further reduce power consumption and help to conserve natural resources.

It will be apparent to one skilled in the art that there are a relatively large number of changes that can be made in the embodiments described without departing from the spirit and scope of the present invention. Some of these alternatives have already been described, such as installing multiple module power supplies into desk-top general-purpose computers, and the different ways to signal a power-up mode to sleeping computers. In particular there are many equivalent ways that circuitry may be arranged and implemented in the many embodiments described.

What is claimed is:

1. A power supply system for supplying power to a computer having a full power mode and a standby power mode, wherein a subset of power-using elements of the computer are powered in the standby power mode, the power supply system comprising:

a first power supply module connected to and supplying power to power-using elements of the computer not included in the subset of power-using elements powered in the standby power mode;

control circuity sensing external inputs to the computer, and having a control connection to the first power supply module; and a second power supply module connected to and supplying power to power-using elements of the computer included in the subset of power-using elements powered in the standby power mode, including the control circuitry;

wherein the control circuitry, through the control connection to the first power supply module, turns the first power supply module off to enter the standby power mode, and turns the first power supply module on in response to at least one of the sensed external inputs to resume the full power mode.

2. A power supply system as in claim 1 wherein at least one power-using element powered by the second power supply in the full power mode, is shut off upon the computer entering the standby power mode, by being connected to the second power supply through normally-open contacts of an electrically-operable switch whose operating element is connected to an output of the first power supply, such that the normally-open contacts are open when the first power supply is turned off and closed when the first power supply is turned on.

3. A power supply system as in claim 2 wherein the at least one power-using element powered by the second power supply in the full power mode and shut off upon the computer entering the standby power mode, is a system board for the computer.

4. A power supply system as in claim 1 wherein the external inputs comprise input from one of a ring indicator connected to the control circuitry for indicating a telephone-based input to the computer, or a keyboard connected to the control circuitry.

5. A power supply system as in claim 1 wherein the control circuitry comprises a keyboard controller.

6. A computer having a full power mode and a standby power mode, wherein a subset of power-using elements of the computer are powered in the standby power mode, the computer comprising:

a first power supply module connected to and supplying power to power-using elements of the computer not included in the subset of power-using elements powered in the standby power mode;

control circuitry sensing external inputs to the computer, and having a control connection to the first power supply module; and a second power supply module connected to and supplying power to power-using elements of the computer included in the subset of power-using elements powered in the standby power mode, including the control circuitry;

wherein the control circuitry, through the control connection to the first power supply module, turns the first power supply module off to enter the standby power mode, and turns the first power supply module on in response to at least one of the sensed external inputs to resume the full power mode.

7. A computer as in claim 6 wherein at least one power-using element powered by the second power supply in the full power mode, is shut off upon the computer entering the standby power mode, by being connected to the second power supply through normally-open contacts of an electrically-operable switch whose operating element is connected to an output of the first power supply, such that the normally-open contacts are open when the first power supply is turned off and closed when the first power supply is turned on.

8. A computer as in claim 6 wherein the external inputs comprise input from one of a ring indicator connected to the control circuitry for indicating a telephone-based input to the computer, or a keyboard connected to the control circuitry.

9. A computer as in claim 6 wherein the at least one power-using element powered by the second power supply in the full power mode and shut off upon the computer entering the standby power mode, is a system board for the computer.

10. A computer as in claim 9 having also a suspend mode, wherein the control circuitry switches power from the second power supply module to the system board.

11. A computer as in claim 10 wherein the full power mode, the standby mode, and the suspend mode may be initiated by user input.

12. A computer as in claim 6 wherein the control circuitry comprises a keyboard controller.

13. A method for improving efficiency in providing power to a computer having a full power mode and a standby power mode, wherein a subset of power-using elements of the computer are powered in the standby power mode, comprising the steps of:

(a) supplying power to power-using elements not included in the subset of power-using elements from a first power supply module;

(b) supplying power to power-using elements included in the subset of power-using elements from a second power supply module; and turning the first power supply module off and on, while the second power supply module remains on, to initiate the standby and the full power mode respectively.

14. The method of claim 13 wherein a system board having a CPU and a memory for the computer, is powered from the second power supply module through a normally open path of a switch electrically operable by output of the first power supply module.

15. The method of claim 13 wherein the first power supply module is turned off and on by a keyboard controller responsive to user inputs, including user inputs at a keyboard.

16. The method of claim 15 wherein the keyboard controller turns the first power supply on in response to a ring indicator indicating an incoming telephone call.

\* \* \* \* \*